United States Patent
Zhang et al.

(10) Patent No.: US 10,314,089 B2
(45) Date of Patent: *Jun. 4, 2019

(54) METHOD PERFORMED BY A USER EQUIPMENT, METHOD PERFORMED BY AN ENODEB, USER EQUIPMENT AND ENODEB

(71) Applicant: Sharp Kabushiki Kaisha, Sakai, Osaka (JP)

(72) Inventors: Meng Zhang, Shanghai (CN); Qi Jiang, Shanghai (CN); Renmao Liu, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,728

(22) Filed: Feb. 2, 2018

(65) Prior Publication Data

US 2018/0160460 A1   Jun. 7, 2018

Related U.S. Application Data

(63) Continuation of application No. 15/507,087, filed as application No. PCT/CN2015/089843 on Sep. 17, 2015, now Pat. No. 9,888,505.

(30) Foreign Application Priority Data

Sep. 22, 2014   (CN) .......................... 2014 1 0486472

(51) Int. Cl.
H04W 76/11   (2018.01)
H04W 4/70   (2018.01)
(Continued)

(52) U.S. Cl.
CPC .......... *H04W 76/11* (2018.02); *H04L 5/0005* (2013.01); *H04L 5/0053* (2013.01);
(Continued)

(58) Field of Classification Search
CPC ...................................... H04W 76/11
(Continued)

(56) References Cited

U.S. PATENT DOCUMENTS

| 2004/0196850 | A1* | 10/2004 | Ho | H04W 72/1257 370/395.4 |
|---|---|---|---|---|
| 2007/0076677 | A1 | 4/2007 | Batariere et al. | |
| 2015/0223279 | A1 | 8/2015 | Jiao et al. | |

FOREIGN PATENT DOCUMENTS

WO   WO 2014/012457 A1   1/2014

OTHER PUBLICATIONS

3GPP TSG RAN WG1 Meeting #78, "Chairman's Notes of Agenda Item 7.2.3 LTE Device to Device Proximity Services"; R1-143590, Dresdan, Germany Aug. 18, 2014-Aug. 22, 2014.
(Continued)

*Primary Examiner* — Joel Ajayi
(74) *Attorney, Agent, or Firm* — Birch, Stewart, Kolasch & Birch, LLP (57) ABSTRACT

The present disclosure provides a method for a base station informing a user equipment (UE) of a resource configuration for D2D PSCCH, and corresponding base station and user equipment. The method comprising: generating D2D grant information, the D2D grant information including D2D PSCCH resource configuration instruction information which is used to indicate the time-frequency position of a first physical resource block pair for transmitting PSCCH; and transmitting the D2D grant information to the UE, wherein the time-frequency position of a second physical resource block pair for transmitting PSCCH can be derived
(Continued)

from the time-frequency position of the first physical resource block pair.

12 Claims, 6 Drawing Sheets

(51) Int. Cl.
*H04W 72/04* (2009.01)
*H04L 5/00* (2006.01)
*H04W 76/28* (2018.01)
*H04W 76/14* (2018.01)
*H04W 4/20* (2018.01)

(52) U.S. Cl.
CPC .......... *H04L 5/0064* (2013.01); *H04L 5/0091* (2013.01); *H04W 4/70* (2018.02); *H04W 72/042* (2013.01); *H04W 72/0406* (2013.01); *H04W 4/20* (2013.01); *H04W 76/14* (2018.02); *H04W 76/28* (2018.02)

(58) Field of Classification Search
USPC ........................................................ 455/450
See application file for complete search history.

(56) References Cited

OTHER PUBLICATIONS

Extended European Search Report issued in the corresponding European Patent Application No. 15843333.4, dated Feb. 15, 2018.
U.S. Notice of Allowance for co-pending U.S. Appl. No. 15/507,087 dated Oct. 4, 2017.

\* cited by examiner

METHOD PERFORMED BY A USER EQUIPMENT, METHOD PERFORMED BY AN ENODEB, USER EQUIPMENT AND ENODEB

This application is a continuation of U.S. patent application Ser. No. 15/507,087, filed on Feb. 27, 2017, which is a National Phase of PCT International Application No. PCT/CN2015/089843 filed on Sep. 17, 2015 and claims priority to Chinese Patent Application No. 201410486472.2 filed on Sep. 22, 2014. The entire contents of all of the above applications are hereby expressly incorporated by reference into the present application.

TECHNICAL FIELD

The invention relates to the field of wireless communication technique. Particularly the invention relates to a method for allocating resources for a communication between devices, and a base station and user equipment thereof.

BACKGROUND

Modern wireless mobile communication system presents two significant features. The first feature is high-speed broadband. For example, the bandwidth of the fourth generation wireless mobile communication systems may be up to 100 MHz, and the downlink rate may be up to 1 Gbps. The second feature is the mobile Internet, which facilitates mobile surfing on the internet, mobile video on demand, online navigation and other emerging services. The two features put forward higher requirements for wireless mobile communication technologies, such as: ultra-high speed wireless transmission, inter-regional interference suppression, reliable transmission of signals during movement, support for distributed/centralized signal processing, and the like. In the future enhanced fourth generation (4G) and 5th generation (5G) wireless mobile communication systems, the above development requirements need to be satisfied.

In October 2007, the International Telecommunication Union (ITU) approved Worldwide Interoperability for Microwave Access Systems (WiMax) to become the fourth 3G standard. The event is actually a 4G standard battle rehearsal. In fact, in response to the challenges of wireless IP technology flow represented by Wireless LAN and WiMax, from 2005 onwards, the 3GPP organization begins to proceed with a totally new system upgrade, i.e. the standardization work of the Long Term Evolution (LTE) system. It is a quasi-four generations system based on the Orthogonal Frequency Division Multiplexing (OFDM) technology, a first edition of which was launched in early 2009 and gradually started business in 2010 around the world. Meanwhile, the standardization on the fourth generation wireless mobile communication systems (4G, the Fourth Generation) by the 3GPP Organization has also been started in the first half of 2008, which is called Long Term Evolution Advanced (LTE-A). The key standardization of the physical layer process of the system was completed in early 2011. In November 2011, ITU organizations officially announced, in Chongqing, China, that LTE-A system and WiMax systems are two official standards of the 4G systems. Currently, the commercial process of LTE-A system is being gradually expanded worldwide.

In the next decade, for the enhanced fourth-generation wireless mobile communication system, there are generally the following development requirements:

Higher-speed wireless broadband, and focus on optimizing local hotspots in a cell;
Further improvement of the user experience, in particular the need to optimize communication services at the cell boundary area;
The need to continue the researches of new technologies for improving the spectral efficiency, considering that the available spectrum cannot be expanded 1000 times;
High frequency spectrum (5 GHz, or even higher) will be put into use in order to obtain a larger communication bandwidth;
Coordination among existing networks (2G/3G/4G, WLAN, WiMax, etc.) for sharing data traffic;
Specific optimizations for different traffics, applications, and services;
Strengthening the capacity of the system to support large-scale machine communications;
Flexible, intelligent and inexpensive network planning and layout;
Designing schemes for saving the network electricity consumption and the user equipment battery consumption.

To achieve the above development requirements, the international Third Generation Partnership Project (3GPP) organization, at the 58th plenary meeting, discussed and adopted the device-to-device (D2D) communications technology as a key technology of the enhanced fourth generation wireless mobile communication system.

The D2D technology allows a local communication or peer-to-peer communication without access to the core network. Using a D2D technology transmission, it has a very positive effect in reducing the base station load and extending the battery life of mobile terminal. Typically based on whether there is a macro base station coverage in the scene in which the user equipment (hereinafter referred to as D2D User Equipment) implements the D2D transmission, scenes in which the D2D user equipment is used can be classified as follows: covered by a network, no network coverage, and partially covered by a network, wherein the scene partially covered by a network refers to the case where both D2D user equipment covered by a network and D2D user equipment without network coverage are included.

Currently for D2D communications, in particular the D2D communication within base station coverage, 3GPP defines D2D grant information (Grant). In this grant information, 6 bits will be used for indicating the time-frequency resource positions occupied by D2D PSCCH (Physical Sidelink Control Channel). At present, there is no standardized solution in the prior art for effectively utilizing these 6 bits to indicate the time-frequency resource positions occupied by PSCCH.

Therefore, a solution which can effectively use these 6 bits to inform the UE of the time-frequency resources for the transmission of D2D PSCCH is required.

SUMMARY

To achieve the above object, the present invention provides a method for a base station indicating user equipment a resource configuration about D2D PSCCH and a method for the user equipment acquiring this indication, and a base station and user equipment corresponding to these methods.

According to a first aspect of the present invention, a method for informing user equipment (UE) of a resource configuration for device-to-device (D2D) PSCCH is provided. The method comprises: generating D2D grant information, the D2D grant information including D2D PSCCH resource configuration instruction information which is used to indicate the time-frequency position of a first physical resource block pair for transmitting PSCCH; and transmitting the D2D grant information to the UE, wherein the time-frequency position of a second physical resource block pair for transmitting PSCCH can be derived from the time-frequency position of the first physical resource block pair.

According to a second aspect of the present invention, a method for acquiring, at user equipment (UE), a resource configuration for device-to-device (D2D) PSCCH is provided. The method comprising: receiving D2D grant information from a base station, the D2D grant information including D2D PSCCH resource configuration instruction information which is used to indicate the time-frequency position of a first physical resource block pair for transmitting PSCCH; extracting the D2D PSCCH resource configuration instruction information from the D2D grant information to determine the first physical resource block pair and a second physical resource block pair for transmitting the D2D PSCCH, wherein the time-frequency position of the second physical resource block pair is derived from the time-frequency position of the first physical resource block pair.

According to a third aspect of the present invention, a base station is provided, comprising: a generating unit configured to generate D2D grant information, the D2D grant information including D2D PSCCH resource configuration instruction information which is used to indicate the time-frequency position of a first physical resource block pair for transmitting PSCCH; and a transmitting unit configured to transmit the D2D grant information to the UE, wherein the time-frequency position of a second physical resource block pair for transmitting PSCCH can be derived from the time-frequency position of the first physical resource block pair.

According to a fourth aspect of the present invention, user equipment (UE) is provided, comprising: a receiving unit configured to receive D2D grant information from a base station, the D2D grant information including D2D PSCCH resource configuration instruction information which is used to indicate the time-frequency position of a first physical resource block pair for transmitting PSCCH; and an extracting unit configured to extract the D2D PSCCH resource configuration instruction information from the D2D grant information to determine the first physical resource block pair and a second physical resource block pair for transmitting the D2D PSCCH, wherein the time-frequency position of the second physical resource block pair is derived from the time-frequency position of the first physical resource block pair.

According to a fifth aspect of the present invention, a method for informing user equipment (UE) of a resource configuration for device-to-device (D2D) PSCCH is provided. The method comprising: generating D2D grant information, the D2D grant information including D2D PSCCH resource configuration instruction information which is used to indicate the time domain positions of a first physical resource block pair and a second physical resource block pair for transmitting PSCCH and the frequency domain position of the first physical resource block pair; and transmitting the D2D grant information to the UE, wherein the frequency domain position of the second physical resource block pair can be derived from the frequency domain position of the first physical resource block pair.

According to a sixth aspect of the present invention, a method for acquiring, at user equipment (UE), a resource configuration for device-to-device (D2D) PSCCH is provided. The method comprising: receiving D2D grant information from a base station, the D2D grant information including D2D PSCCH resource configuration instruction information which is used to indicate the time domain positions of a first physical resource block pair and a second physical resource block pair for transmitting PSCCH and the frequency domain position of the first physical resource block pair; extracting the D2D PSCCH resource configuration instruction information from the D2D grant information to determine the first physical resource block pair and the second physical resource block pair for transmitting the D2D PSCCH, wherein the frequency domain position of the second physical resource block pair is derived from the frequency domain position of the first physical resource block pair.

According to a seventh aspect of the present invention, a base station is provided, comprising: a generating unit configured to generate D2D grant information, the D2D grant information including D2D PSCCH resource configuration instruction information which is used to indicate the time domain positions of a first physical resource block pair and a second physical resource block pair for transmitting PSCCH and the frequency domain position of the first physical resource block pair; and a transmitting unit configured to transmit the D2D grant information to the UE, wherein the frequency domain position of the second physical resource block pair can be derived from the frequency domain position of the first physical resource block pair.

According to an eighth aspect of the present invention, user equipment (UE) is provided, comprising: a receiving unit configured to receive D2D grant information from a base station, the D2D grant information including D2D PSCCH resource configuration instruction information which is used to indicate the time domain positions of a first physical resource block pair and a second physical resource block pair for transmitting PSCCH and the frequency domain position of the first physical resource block pair; and an extracting unit configured to extract the D2D PSCCH resource configuration instruction information from the D2D grant information to determine the first physical resource block pair and the second physical resource block pair for transmitting the D2D PSCCH, wherein the frequency domain position of the second physical resource block pair is derived from the frequency domain position of the first physical resource block pair.

In some embodiments of the present invention, the D2D grant information is transmitted on a PDCCH or EPDCCH using DCI format 0.

In some embodiments of the present invention, the base station further scrambles the generated D2D grant information and transmits the scrambled D2D grant information to the user equipment. Accordingly, when the user equipment receives the scrambled D2D grant information, it descrambles the scrambled D2D grant information first, and then extracts the PSCCH resource configuration instruction information from the descrambled D2D grant information. Preferably, D2D—RNTI can be used to scramble the D2D grant information.

BRIEF DESCRIPTION OF THE DRAWINGS

The above and other features of the present invention will become more apparent from the following detailed description when taken in conjunction with the accompanying drawings in which.

DETAILED DESCRIPTION

In connection to the accompanying drawings and the specific embodiments, a method for informing, by a base station, user equipment (UE) of a resource configuration for device-to-device (D2D) PSCCH, a method for acquiring, at user equipment (UE), a resource configuration for device-to-device (D2D) PSCCH and corresponding base station and user equipment proposed by the invention will be set forth in detail below. It should be noted that the present invention should not be limited to the specific embodiments described hereinafter. In addition, for the sake of brevity, detailed descriptions of well-known techniques not directly related to the present invention are omitted to prevent confusion in the understanding of the present invention.

Embodiments of the present invention mainly directs to D2D communication within the coverage of a base station. When mentioning the user equipment (UE) herein, it refers to a terminal device supporting the D2D communication. Although the LTE mobile communication system is used below as an example of the application environment, it should be understood that the present invention is not limited to the LTE environment, but is applicable to other wireless communication systems which needs to inform the UE of the resource configuration for D2D PSCCH, for example, future 5G cellular communication systems and the like.

Figure 1:
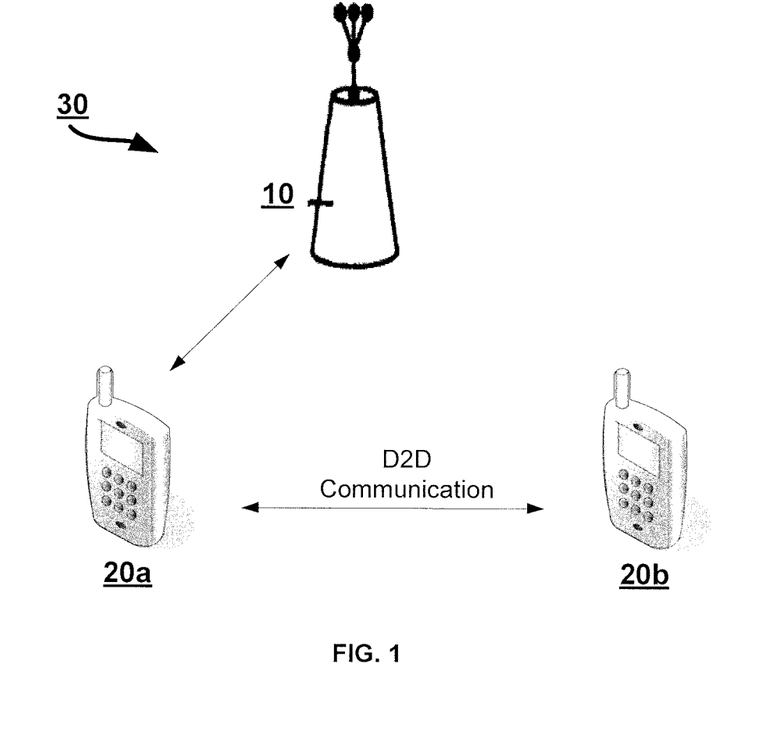
FIG. 1 illustrates a schematic diagram of the communication system in which the present invention is applicable.

FIG. 1 illustrates a schematic diagram of the communication system 30 in which the present invention is applicable. System 30 includes a base station 10 and user equipments 20a and 20b. As shown, user equipment 20a is within the coverage of base station 10, and can communicate with base station 10. In addition, D2D communication is supported between user equipments 20a and 20b. Although FIG. 1 illustrates only one base station and two user equipments, it should be understood that system 30 may include more base stations and user equipments.

Figure 2:
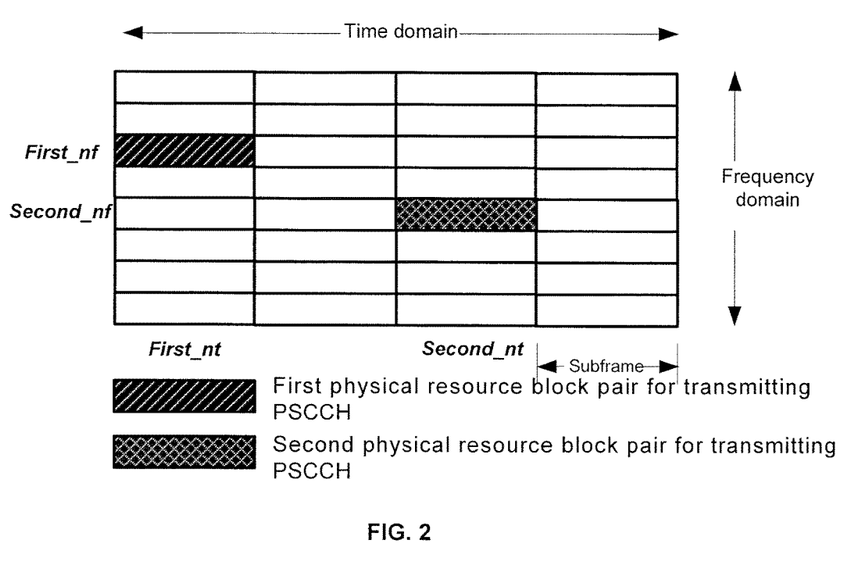
FIG. 2 illustrates a schematic view of the physical resource block pairs used for transmitting the PSCCH.

Important channels between the base station 10 and user equipment 20a include: physical downlink control channel (PDCCH), and enhanced physical downlink control channel (EPDCCH). As mentioned above, 3GPP specifies that PDCCH and EPDCCH can be used to transmit D2D grant information (Grant) corresponding to D2D PSCCH. In the grant information, 6 bits will be used for indicating the time-frequency resource positions occupied by PSCCH. Currently, 3GPP specifies that PSCCH can be transmitted in two physical resource block pairs (PRB pairs) in a PSCCH transmission period. FIG. 2 illustrates a schematic view of the physical resource block pairs used for transmitting the PSCCH. As can be seen from FIG. 2, a first physical block pair can be determined by the time domain position first_nt and the frequency domain position first_nf, and a second physical block pair can be determined by the time domain position second_nt and the frequency domain position second_nf.

Figure 3:
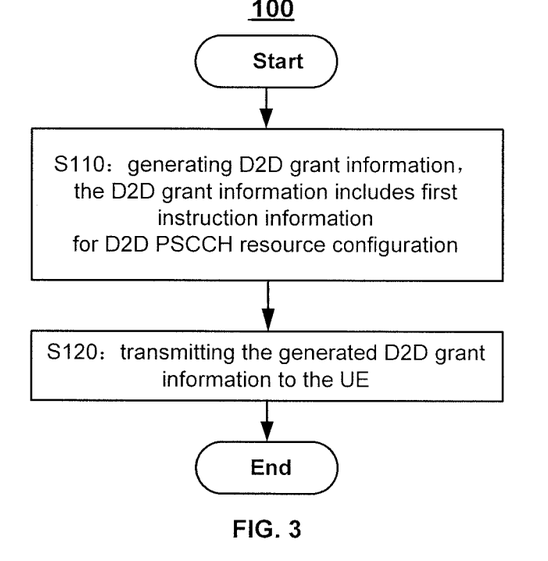
FIG. 3 illustrates a flowchart for a method for informing user equipment (UE) of a resource configuration for D2D PSCCH according to the first embodiment of the invention.

FIG. 3 illustrates a flowchart for a method 100 for informing user equipment (UE) of a resource configuration for D2D PSCCH according to the first embodiment of the invention.

In step S110, the base station generates D2D grant information for the UE. The D2D grant information includes first instruction information for D2D PSCCH resource configuration. The first instruction information indicates the frequency domain position (first_nf) and the time domain position (first_nt) of a first physical resource block pair for transmitting PSCCH.

In this first embodiment, the first instruction information does not include information indicating the frequency domain position and the time domain position of the second physical resource block pair for transmitting PSCCH. However, the frequency domain position and the time domain position of the second physical block pair can be implicitly obtained from the frequency domain position and the time domain subframe position of the first physical resource block pair. The relative position relationship between the second physical block pair and the first physical block pair can be semi-statically configured via RRC.

As an example implementation, the frequency domain position first_nf of the first physical resource block pair may be acquired by rounding down a quotient resulted from dividing the first instruction information by a time-domain resource indication Nt, while the time domain position first_nt of the first physical resource block pair may be acquired by the residue resulted from the first instruction information mod the time-domain resource indication Nt.

Alternatively, Nt may be a value related to PSCCH period (saPeriod), which is information associated with a time domain resource configured via RRC. The PSCCH period typically corresponds to a number of sub-frames.

In this case, it may be specified that Nt=saPeriod/2;

Or, it may also be specified that Nt=saPeriod.

Alternatively, Nt may be related to the number M of subframes in subframes corresponding to saPeriod, which are actually available to be allocated to D2D PSCCH for transmission. saPeriod is information associated with a time domain resource configured via RRC.

In this case, it may be specified that Nt=M/2;

Or, it may be specified that Nt=M.

As another example implementation, the time domain position first_nt of the first physical resource block pair may be acquired by rounding down a quotient resulted from dividing the first instruction information by a frequency-domain resource indication Nf, while the frequency domain position first_nf of the first physical resource block pair (PRB pair) may be acquired by the residue resulted from the first instruction information mod the frequency-domain resource indication Nf. Nf may a value related to saNum- PRB, which is information associated with a frequency domain resource configured via RRC.

For example, it may be specified that Nf=saNumPRB;

Or, it may be specified that Nf=saNumPRB/2.

In a particular implementation, the first instruction information has a length of 6 bits.

In step S120, the base station transmits the generated D2D grant information to the UE. For example, the D2D grant information may be transmitted via PDCCH or EPDCCH transmission, and DCI format 0 may be used as the corresponding transmission format for the D2D grant information.

Preferably, the method further includes a scrambling step 100. Specifically, the base station firstly scrambles the D2D grant information generated in step 110, and then transmitted the scrambled D2D grant information to the user equipment in step S120. Preferably, D2D-RNTI (Radio Network Temporary Identifier) may be used to scramble the D2D grant information.

Figure 4:
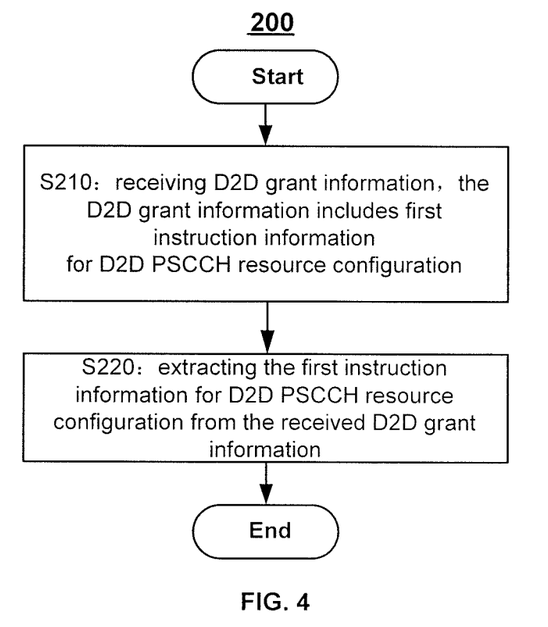
FIG. 4 illustrates a flowchart for a method for acquiring, at user equipment (UE), a resource configuration for device-to-device (D2D) PSCCH according to the first embodiment of the invention.

FIG. 4 illustrates a flowchart for a method 200 for acquiring, at user equipment (UE), a resource configuration for device-to-device (D2D) PSCCH according to the first embodiment of the invention.

In step S210, the user equipment receives the D2D grant information from a base station. The D2D grant information includes first instruction information for D2D PSCCH resource configuration. The first instruction information indicates the frequency domain position (first_nf) and the time domain position (first_nt) of a first physical resource block pair for transmitting PSCCH.

In step S220, the user equipment extracts the first instruction information for D2D PSCCH resource configuration from the received D2D grant information to determine the first physical resource block pair and a second physical resource block pair for transmitting the D2D PSCCH.

As described above, in the first embodiment, the first indication information does not include information for indicating the frequency domain position and the time domain position of the second physical resource block pair for transmitting PSCCH. However, the frequency domain position (second_nf) and the time domain position (second_nt) of the second physical block pair can be implicitly obtained from the frequency domain position and the time domain subframe position of the first physical resource block pair. The relative position relationship between the second physical block pair and the first physical block pair can be semi-statically configured via RRC.

As an example implementation, the frequency domain position (second_nf) and the time domain position (second_nt) of the second physical block pair may be derived as follows:

second_nt=first_nt+Nt, and second_nf=mod (first_nf+ceil (Nf/2), Nf);

As another example implementation, the frequency domain position (second_nf) and the time domain position (second_nt) of the second physical block pair may be derived as follows:

second_nt=first_nt+Nt/2, second_nf=mod (first_nf+cell (Nf), Nf*2).

Here, first_nt and second_nt represent positions of the frames transmitting PSCCH within one saPeriod in all sub-frames, or represent positions of the frames transmitting PSCCH within one saPeriod in all sub-frames allocable to the D2D PSCCH (i.e., the aforementioned M subframes).

Preferably, the method 200 further comprises a descrambling step. If the user equipment received, in step S210, the scrambled D2D grant information, it firstly descrambles the D2D, and then, in step S220, extracts the first instruction information for D2D PSCCH resource configuration from the descrambled D2D grant information.

FIGS. 3 and 4 respectively show operations performed at the base station and the UE according to the first embodiment of the invention, and have corresponding operations. Therefore the detailed operations of method 200 will be not repeated here.

Figure 5:
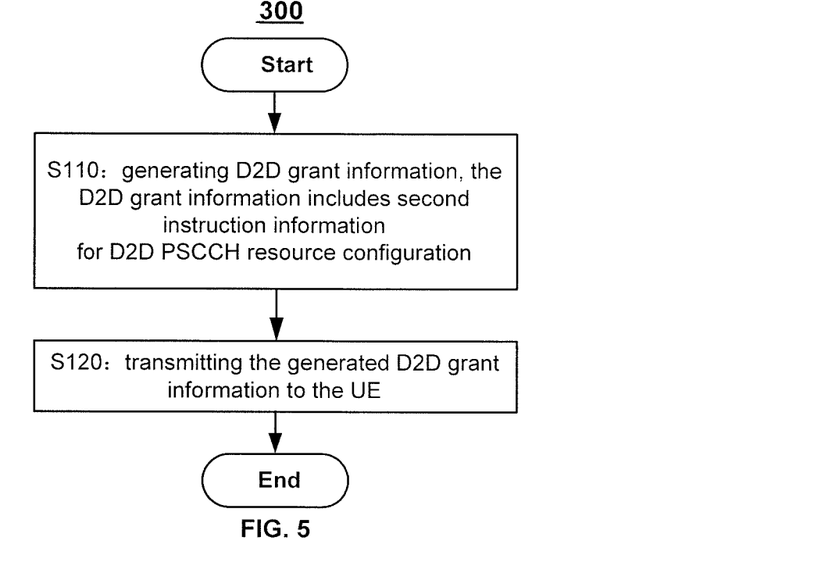
FIG. 5 illustrates a flowchart for a method for informing user equipment (UE) of a resource configuration for D2D PSCCH according to the second embodiment of the invention.

FIG. 5 illustrates a flowchart for a method 300 for informing user equipment (UE) of a resource configuration for D2D PSCCH according to the second embodiment of the invention.

In step S310, the base station generates D2D grant information for the UE. The D2D grant information includes second instruction information for D2D PSCCH resource configuration. The second instruction information indicates the time domain positions (first_nt and second_nt) of a first and a second physical resource block pairs for transmitting PSCCH and the frequency position (first_nf) of the first physical resource block pair.

According to a second embodiment of the present invention, the second instruction information does not include information indicating the frequency domain position of the second physical resource block pair for transmitting PSCCH. However, the frequency domain position of the second physical block pair can be implicitly obtained from the frequency domain position of the first physical resource block pair. The relationship between the frequency domain position of the second physical block pair and the frequency domain position of the first physical block pair can be semi-statically configured via RRC.

The first (or last) X bits in the second indication information are used for indicating the first_nt and the second_nt, and the last (or first) Y bits are used for indicating the first_nf, wherein X+Y=6.

Figure 7:
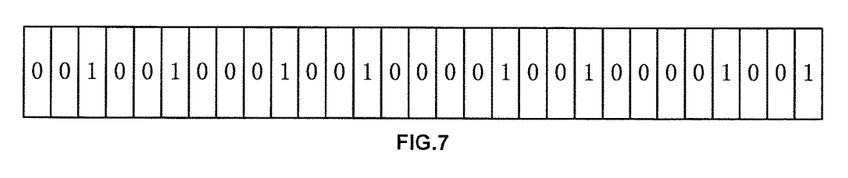
FIG. 7 illustrates an example of PSCCH transmission pattern.
Figure 8:
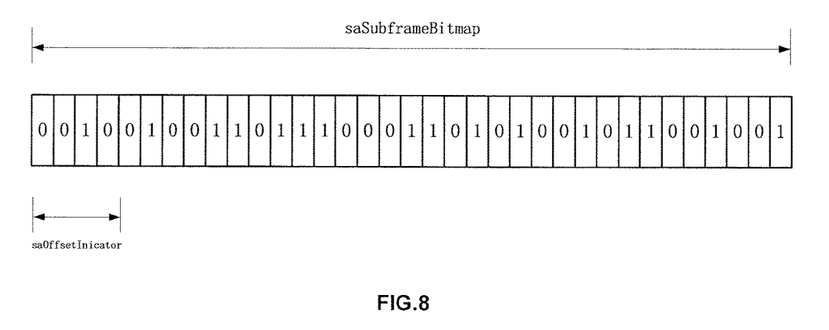
FIG. 8 illustrates an another example of PSCCH transmission pattern.

In this second embodiment, the system predefines a PSCCH pattern corresponding to the X bits. The PSCCH pattern may correspond to the T-RPT pattern of the data, as shown in FIG. 7. Or, the transmission patterns may correspond to positions of subframes in a SaPeriod available for the PSCCH transmission, which are indicated by saSubframeBitmap and saOffsetIndicator, as shown in FIG. 8. In FIGS. 7 and 8, 0 represents that the marked subframe is not allocated for PSCCH transmission, while 1 represents that the marked subframe is allocated for PSCCH transmission. Furthermore, in FIG. 8, the subframe indicated by saOffsetIndicator is not allowed to be used for PSCCH transmission even if it is marked by 1.

As an example implementation, if the length of X is 2 (the length of X can be configured by RRC or predefined by the system), then:

X=00 may represent that, in the PSCCH pattern, within 3 continuous subframes allocated for PSCCH transmission, the first one and the second one are used for PSCCH transmission.

X=01 may denote that, in the PSCCH pattern, within 3 continuous subframes allocated for PSCCH transmission, the first one and the third one are used for PSCCH transmission.

X=10 may denote that, in the PSCCH pattern, within 3 continuous subframes allocated for PSCCH transmission, the second one and the third one are used for PSCCH transmission.

X=11 is unused.

As another example implementation, if the length of X is 3 (this length can be configured by RRC or predefined by the system), then:

X=000 may denote that, in the PSCCH pattern, within 4 continuous subframes allocated for PSCCH transmission, the first one and the second one are used for PSCCH transmission.

X=001 may denote that, in the PSCCH pattern, within 4 continuous subframes allocated for PSCCH transmission, the first one and the third one are used for PSCCH transmission.

X=010 may denote that, in the PSCCH pattern, within 4 continuous subframes allocated for PSCCH transmission, the first one and the fourth one are used for PSCCH transmission.

X=011 may denote that, in the PSCCH pattern, within 4 continuous subframes allocated for PSCCH transmission, the second one and the third one are used for PSCCH transmission.

X=100 may denote that, in the PSCCH pattern, within 4 continuous subframes allocated for PSCCH transmission, the second one and the fourth one are used for PSCCH transmission.

X=101 may denote that, in the PSCCH pattern, within 4 continuous subframes allocated for PSCCH transmission, the third one and the fourth one are used for PSCCH transmission.

X=110 and X=111 are unused.

As yet another example implementation, if the length of X is 4 (this length can be configured by RRC or predefined by the system), then:

X=0000 may denote that, in the PSCCH pattern, within 6 continuous subframes allocated for PSCCH transmission, the first one and the second one are used for PSCCH transmission.

X=0001 may denote that, in the PSCCH pattern, within 6 continuous subframes allocated for PSCCH transmission, the first one and the third one are used for PSCCH transmission.

X=0010 may denote that, in the PSCCH pattern, within 6 continuous subframes allocated for PSCCH transmission, the first one and the fourth one are used for PSCCH transmission.

X=0011 may denote that, in the PSCCH pattern, within 6 continuous subframes allocated for PSCCH transmission, the first one and the fifth one are used for PSCCH transmission.

X=0100 may denote that, in the PSCCH pattern, within 6 continuous subframes allocated for PSCCH transmission, the first one and the sixth one are used for PSCCH transmission.

X=0101 may denote that, in the PSCCH pattern, within 6 continuous subframes allocated for PSCCH transmission, the second one and the third one are used for PSCCH transmission.

X=0110 may denote that, in the PSCCH pattern, within 6 continuous subframes allocated for PSCCH transmission, the second one and the fourth one are used for PSCCH transmission.

X=0111 may denote that, in the PSCCH pattern, within 6 continuous subframes allocated for PSCCH transmission, the second one and the fifth one are used for PSCCH transmission.

X=1000 may denote that, in the PSCCH pattern, within 6 continuous subframes allocated for PSCCH transmission, the second one and the sixth one are used for PSCCH transmission.

X=1001 may denote that, in the PSCCH pattern, within 6 continuous subframes allocated for PSCCH transmission, the third one and the fourth one are used for PSCCH transmission.

X=1010 may denote that, in the PSCCH pattern, within 6 continuous subframes allocated for PSCCH transmission, the third one and the fifth one are used for PSCCH transmission.

X=1011 may denote that, in the PSCCH pattern, within 6 continuous subframes allocated for PSCCH transmission, the third one and the sixth one are used for PSCCH transmission.

X=1100 may denote that, in the PSCCH pattern, within 6 continuous subframes allocated for PSCCH transmission, the fourth one and the fifth one are used for PSCCH transmission.

X=1101 may denote that, in the PSCCH pattern, within 6 continuous subframes allocated for PSCCH transmission, the fourth one and the sixth one are used for PSCCH transmission.

X=1110 may denote that, in the PSCCH pattern, within 6 continuous subframes allocated for PSCCH transmission, the fifth one and the sixth one are used for PSCCH transmission.

X=1111 is unused.

According to the second embodiment of the present invention, if the length of X is K, and the length of Y is L=6−K, then:

As an implementation, a number, saNumPRB, of PRBs allocated for PSCCH transmission is divided into $2^L$ groups in the frequency domain, wherein the size of each group is equal to the saNumPRB divided by $2^L$ and then rounded down. Further, a bitmap with a length of L is used to indicate that, in the $2^L$ PRB pair groups, which group is used for the transmission of the first physical resource block pair of the PSCCH. For example, if the length of X is 3, the length of Y is 3, and saNumPRB=40, then the entire frequency domain resource allocated to the PSCCH may be divided into $2^3$=8 groups, the size of each group being $40/2^3$=5.

Then the value of Y may be designed as follows:

Y=000 denotes that the first physical resource block pair of PSCCH is transmitted in the first PRB pair group.

Y=001 denotes that the first physical resource block pair of PSCCH is transmitted in the second PRB pair group.

Y=010 denotes that the first physical resource block pair of PSCCH is transmitted in the third PRB pair group.

Y=011 denotes that the first physical resource block pair of PSCCH is transmitted in the fourth PRB pair group.

Y=100 denotes that the first physical resource block pair of PSCCH is transmitted in the fifth PRB pair group.

Y=101 denotes that the first physical resource block pair of PSCCH is transmitted in the sixth PRB pair group.

Y=110 denotes that the first physical resource block pair of PSCCH is transmitted in the seventh PRB pair group.

Y=111 denotes that the first physical resource block pair of PSCCH is transmitted in the eighth PRB pair group.

Specifically, which resource block in the group indicated by Y is used for PSCCH transmission (i.e. the position of the first resource block in the indicated group) may be determined according to the following criterions.

As an example implementation, the system may predefine that the PSCCH can be transmitted on the first PRB pair in the group or on a fixed PRB pair in each group only.

As another example implementation, it may be determined according to the PCID offset corresponding to the cell in which the UE is located, for example, the residue of the cell PCID mod 3 is equal to the number of the offset PRB pairs.

As yet another example implementation, it may be determined according to the C-RNTI offset of the UE itself, for example, the residue of C-RNTI mod 3 is equal to the number of the offset PRB pairs.

As yet another example implementation, it may be determined according to D2D-RNTI offset, for example, the residue of D2D-RNTI mod 3 is equal to the number of the offset PRB pairs.

In step S320, the base station transmits the generated D2D grant information to the UE. For example, the D2D grant information can be transmitted via PDCCH or EPDCCH transmission, and DCI format 0 may be used as the corresponding transmission format for the D2D grant information.

Preferably, the method further comprises a scrambling step 300. Specifically, the base station firstly scrambles the D2D grant information generated in step 310, and then transmitted the scrambled D2D grant information to the user equipment in step S320. Preferably, D2D-RNTI (Radio Network Temporary Identifier) may be used to scramble the D2D grant information.

Figure 6:
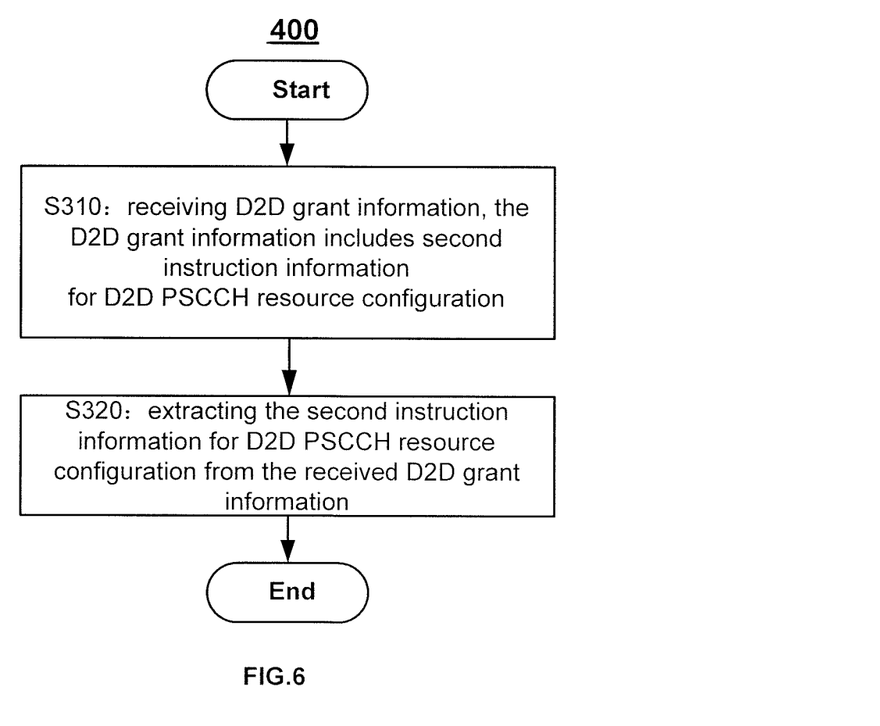
FIG. 6 illustrates a flowchart for a method for acquiring, at user equipment (UE), a resource configuration for device-to-device (D2D) PSCCH according to the second embodiment of the invention.

FIG. 6 illustrates a flowchart for a method 400 for acquiring, at user equipment (UE), a resource configuration for device-to-device (D2D) PSCCH according to the second embodiment of the invention.

In step S410, the user equipment receives the D2D grant information from a base station. The D2D grant information includes second instruction information for D2D PSCCH resource configuration. The second instruction information indicates the time domain position (first_nt and second_nt) of a first and a second physical resource block pairs for transmitting PSCCH and the frequency position (first_nf) of the first physical resource block pair.

In step S420, the user equipment extracts the second instruction information for D2D PSCCH resource configuration from the received D2D grant information to determine the first physical resource block pair and the second physical resource block pair for transmitting the D2D PSCCH.

As described above, according to the second embodiment of the present invention, the second instruction information does not include information indicating the frequency domain position of the second physical resource block pair for transmitting PSCCH. However, the frequency domain position of the second physical block pair can be implicitly obtained from the frequency domain position of the first physical resource block pair. The relationship between the frequency domain position of the second physical block pair and the frequency domain position of the first physical block pair can be semi-statically configured via RRC.

As an example implementation, the frequency domain position (second_nf) of the second physical block pair may be derived as follows:

second_nf=mod (first_nf+ceil (Nf/2), Nf);

or:

second_nf=mod (first_nf+cell (Nf), Nf*2).

Preferably, the method 400 further comprises a descrambling step. If the user equipment received, in step S410, the scrambled D2D grant information, it firstly descrambles the D2D, and then, in step S420, extracts the second instruction information for D2D PSCCH resource configuration from the descrambled D2D grant information.

FIGS. 5 and 6 respectively show operations performed at the base station and the UE according to the second embodiment of the invention, and have corresponding operations. Therefore the detailed operations of method 400 will be not repeated here.

Figure 9:
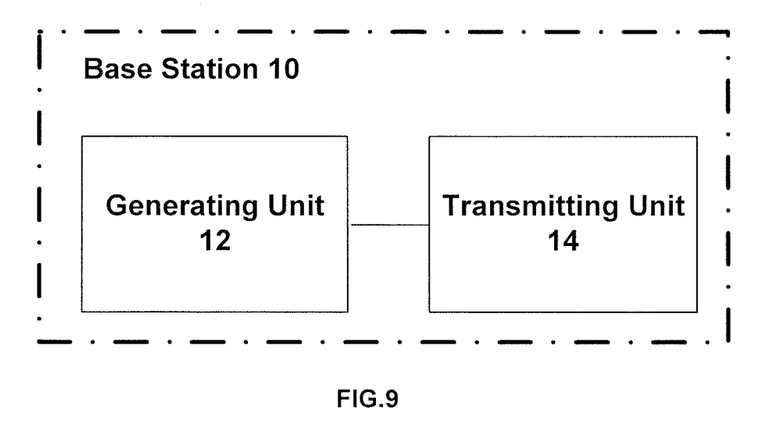
FIG. 9 illustrates a schematic block diagram of a base station according to an embodiment of the invention.

FIG. 9 illustrates a schematic block diagram of a base station according to an embodiment of the invention. As shown, base station 10 may include a transmitting unit 12 and a generating unit 14.

According to a first embodiment of the present invention, the generating unit 12 is configured to generate D2D grant information, wherein the D2D grant information includes first instruction information for D2D PSCCH resource configuration, and the first instruction information indicates the time-frequency position of a first physical resource block pair for transmitting PSCCH.

According to a second embodiment of the present invention, the generating unit 12 is configured to generate D2D grant information, wherein the D2D grant information including second instruction information for D2D PSCCH resource configuration, the second instruction information indicates the time domain positions of a first and a second physical resource block pairs for transmitting PSCCH and the frequency position of the first physical resource block pair.

Transmitting unit 14 is configured to transmit the D2D grant information to the UE.

Preferably, the base station 10 may also include a scrambling unit. The scrambling unit may be configured to scramble the D2D grant information generated by generating unit 12. Thus, transmitting unit 14 transmits to the user equipment the scrambled D2D grant information. Preferably, D2D-RNTI (Radio Network Temporary Identifier) may be used to scramble the D2D grant information.

Figure 10:
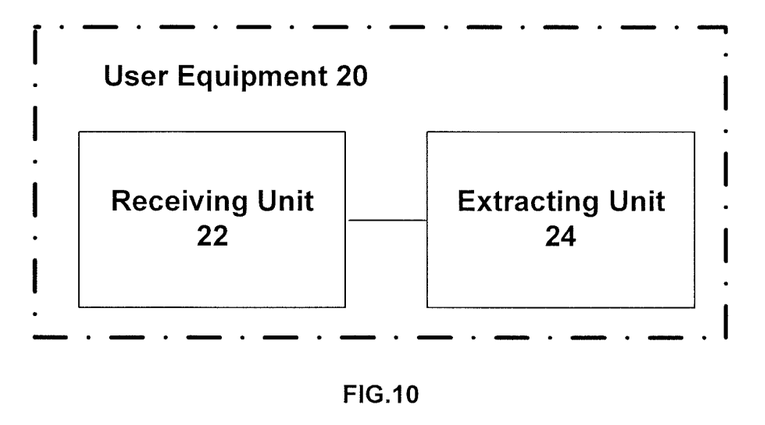
FIG. 10 illustrates a schematic block diagram of user equipment according to an embodiment of the invention.

FIG. 10 illustrates a schematic block diagram of user equipment according to an embodiment of the invention. As shown, user equipment 20 may include receiving unit 22 and extracting unit 24.

According to a first embodiment of the present invention, receiving unit 22 may be configured to receive from device-to-device (D2D) grant information from a base station, wherein the D2D grant information includes first instruction information for D2D PSCCH resource configuration, and the first instruction information indicates the time-frequency position of a first physical resource block pair for transmitting PSCCH.

According to a second embodiment of the present invention, receiving unit 22 may be configured to receive device-to-device (D2D) grant information from a base station, wherein the D2D grant information including second instruction information for D2D PSCCH resource configuration, the second instruction information indicates the time domain positions of a first and a second physical resource block pairs for transmitting PSCCH and the frequency position of the first physical resource block pair.

Extracting unit 24 is configured to extract the PSCCH resource configuration instruction information (the first indication information or second indication information) from the D2D grant information to determine the first physical resource block pair and a second physical resource block pair for transmitting the D2D PSCCH.

Preferably, the user equipment 20 may also include a descrambling unit. The descrambling unit is configured to descramble the D2D grant information received by receiving unit 12. Thereby extracting unit 24 is configured to extract the PSCCH resource configuration instruction information (the first indication information or second indication information) from the descrambled D2D grant information.

The base station according to an embodiment of the present invention may be configured to implement the above method 100 or 300. The user equipment according to an embodiment of the present invention may be configured to perform the above methods 200 and 400. The operations thereof are not repeated here.

It shall be appreciated that the above embodiments of the invention can be implemented in software, hardware, or any combination thereof. For example, various components in the base station and the user equipment described in the embodiments of the invention may be implemented by various devices or circuits, including but not limited to Analog Circuit Device, Digital Circuit Device, Digital Signal Processor (DSP) circuit, Programmable processor, Application Specific Integrated Circuit (ASIC), Field Programmable Gate Array (FPGA), Complex Programmable Logic Device, or any other integrated form.

In the application, the term "base station" refers to a mobile communication data and control switch center that has larger transmission power and broad coverage area, which can achieve the functions including resource assignment scheduling, data receiving and transmitting, etc. The term "user equipment" refers to a user mobile terminal, such as an MTC user mobile terminal, including for example a mobile phone, notebook and other terminal device that can wirelessly communicate with a base station or a micro base station.

Furthermore, the embodiments of the invention described herein can be embodied in a computer program product. More particularly, the computer program product may be a product having a computer readable medium, with computer program logic encoded thereon, which when executed on a computing device, provides operations to enable the solutions of the invention proposed above. The computer program logic, when executed on at least a processor of a computing system, causes the processor to implement the operations (methods) described in the embodiments of the invention. Such configuration of the invention is typically provided as software, codes and/or other data structure that is setup or encoded on a computer readable medium, for example, an optical medium (e.g., CD-ROM), a floppy disk, or a hard disk, or firmware or microcode on one or more ROM or RAM or PROM chip, or downloadable software images on one or more modules, or shared database, etc. The software or firmware or the configuration can be installed on the computing device to have one or more processor of the computing device to implement the solutions described in the embodiments of the invention.

Although the present disclosure is already described with reference to several typical embodiments, it is to be appreciated that various modifications, substitutions or variations can be made without departing from the spirit or essence of the invention. Therefore, the invention shall not be limited to the embodiments, and shall be defined by the appended claims and their equivalents.

We claim:

1. A method performed by a User Equipment (UE), comprising:
receiving 1st indication information from an eNodeB, the $1^{st}$ indication information consisting of 6 bits; and
determining, based on the 1st indication information, (i) time-frequency position for resource block used for first transmission of a Physical Sidelink Control Channel (PSCCH) in a PSCCH period and (ii) time-frequency position of resource block used for second transmission of the PSCCH in the same PSCCH period.

2. A method performed by an eNodeB (eNB), comprising:
generating 1st indication information which consists of 6 bits and on the basis of which a User Equipment determines (i) time-frequency position of resource block used for first transmission of a Physical Sidelink Control Channel (PSCCH) in a PSCCH period and (ii) time-frequency position of resource block used for second transmission of the PSCCH in the same PSCCH period; and
sending the 1st indication information to the User Equipment.

3. A User Equipment (UE), comprising:
a receiving circuitry configured to receive 1st indication information from an eNodeB, the $1^{st}$ indication information consisting of 6 bits; and
a determining circuitry configured to determine, based on the $1^{st}$ indication information, (i) time-frequency position of resource block used for first transmission of a Physical Sidelink Control Channel (PSCCH) in a PSCCH period and (ii) time-frequency position of resource block used for second transmission of the PSCCH in the same PSCCH period.

4. An eNodeB, comprising:
a generating circuitry configured to generate 1st indication information which consists of 6 bits and on the basis of which a User Equipment determines (i) time-frequency position of resource block used for first transmission of a Physical Sidelink Control Channel (PSCCH) in a PSCCH period and (ii) time-frequency position of resource block used for second transmission of the PSCCH in the same PSCCH period; and
a sending circuitry configured to send the 1st indication information to the User Equipment.

5. The method according to claim 1, wherein a frequency position of the physical resource used for the first transmission of the PSCCH is set to be a round-down of a division of the 1st indication information by Nt, where Nt is related to a value configured by RRC.

6. The method according to claim 1, wherein a subframe used for the first transmission of the PSCCH is set to be a remainder a division of the 1st indication information by Nt, where Nt is related to a value configured by RRC.

7. The method according to claim 2, wherein a frequency position of the physical resource used for the first transmission of the PSCCH is set to be a round-down of a division of the 1st indication information by Nt, where Nt is related to a value configured by RRC.

8. The method according to claim 2, wherein a subframe used for the first transmission of the PSCCH is set to be a remainder a division of the 1st indication information by Nt, where Nt is related to a value configured by RRC.

9. The UE according to claim 3, wherein a frequency position of the physical resource used for the first transmission of the PSCCH is set to be a round-down of a division of the 1st indication information by Nt, where Nt is related to a value configured by RRC.

10. The UE according to claim 3, wherein a subframe used for the first transmission of the PSCCH is set to be a remainder a division of the 1st indication information by Nt, where Nt is related to a value configured by RRC.

11. The eNodeB according to claim 4, wherein a frequency position of the physical resource used for the first transmission of the PSCCH is set to be a round-down of a division of the 1st indication information by Nt, where Nt is related to a value configured by RRC.

12. The eNodeB according to claim 4, wherein a subframe used for the first transmission of the PSCCH is set to be a remainder a division of the 1st indication information by Nt, where Nt is related to a value configured by RRC.

\* \* \* \* \*